United States Patent Office 3,822,308
Patented July 2, 1974

3,822,308
PROCESS FOR THE PRODUCTION OF
VINYL ESTERS
Walter Kronig and Gerhard Scharfe, Leverkusen, Germany, assignors to Bayer Aktiengesellschaft, Leverkusen, Germany
No Drawing. Continuation of application Ser. No. 795,027, Jan. 29, 1969. This application Mar. 13, 1972, Ser. No. 234,322
Int. Cl. C07c 67/04
U.S. Cl. 260—497 A                        14 Claims

ABSTRACT OF THE DISCLOSURE

Improvement in a process for the production of vinyl esters by reacting ethylene, lower carboxylic acids with 2 to 4 carbon atoms and oxygen in the gas phase at elevated temperature and normal or elevated pressure, in the presence of supported catalyst consisting essentially of palladium, gold and an alkali metal acetate on a silicic acid support, which improvement comprises preparing the catalyst by treating the support, simultaneously or successively or in combination with a solution A and a solution B, the solution A containing dissolved salts of palladium and gold and the solution B containing compounds which are able to react on the catalyst support with the noble metal salts of the solution A to form water-in-soluble noble metal compounds which are substantially free of halogen, sulphur and nitrogen; impregnating the catalyst support with the solutions A and B or with the combined solution of A and B in quantities which correspond to from 1 to 110% of the absorptive capacity of the catalyst support for these solutions: subjecting the catalyst support impregnated with the solutions A and B to a time/temperature-treatment which is such that 95% at least of the impregnated palladium and 95% at least of the impregnated gold is transformed into water-insoluble noble metal compounds, treating the water-insoluble noble metal compounds with a reducing agent to convey those compounds substantially into the corresponding noble metals and removing the water-soluble compounds which are contained in the catalyst by washing; and applying an alkali metal compound before or after the treatment with the reducing agents, the alkali metal compounds consisting of alkali metal carboxylates or of alkali metal compounds which are wholly or in part transformed into alkali metal carboxylates under the reaction conditions.

This is a continuation of application Ser. No. 795,027 filed Jan. 29, 1969.

This invention relates to a process for the production of vinyl esters.

It is known to prodice vinyl esters by reacting ethylene, certain carboxylic acids and molecular oxygen or air in the gas phase at temperatures of from 100 to 250° C. and at normal or elevated pressure in the presence of supported catalysts which contain palladium. Such a process has been described, for example, in German Patent Specification Nos. 1,185,604 and 1,196,644, German Auslegeschrift No. 1,244,766, and Belgian Patent Specification Nos. 671,895 and 671,896.

We have now found that particularly active supported catalysts containing palladium and gold for the production of vinyl esters from ethylene, lower carboxylic acids with 2 to 4 carbon atoms and oxygen in the gas phase at elevated temperature and at normal or elevated pressure are obtained by the following process. The catalyst support is treated simultaneously or successively, with or without intermediate drying, with a solution A and a solution B, the solution A containing dissolved salts of palladium and gold and optionally salts of other metals, and the solution B containing compounds which are able to react on the catalyst support with the noble metal salts of the solution A to form water-insoluble noble metal compounds which are practically free from halogen, sulphur and nitrogen; the solution A or B or the common solution of A and B is impregnated on the catalyst support in quantities which correspond to from 10 to 110% of the absorptive capacity of the catalyst support for these solutions; the catalyst support with the impregnated solutions A and B is subjected to a time/temperature treatment which is such that 95% at least of the impregnated palladium and 95% at least of the impregnated gold are transformed into water-insoluble noble metal compounds; the water-insoluble noble metal compounds are largely transformed by a treatment with reducing agents into the noble metals and the water-soluble compounds which are contained in the catalyst are removed by washing, before or after the reduction.

In a preferred embodiment of the process, alkali metal carboxylates, especially alkali metal acetates, are applied on the catalyst before or after the treatment with reducing agents, in such quantities that the catalyst, after being dried, contains from 1 to 30% by weight of alkali metal carboxylate. Examples of the alkali metal carboxylates include sodium formate potassium acetate, sodium acetate, lithium acetate, potassium propionate and potassium butyrate.

The following detailed explanations are given for carrying out in such a way that, for example, firstly the catalyst support is impregnated with the solution A, which is then optionally dried, and then it is impregnated with the solution B. However, it is also possible firstly to impregnate the support with the solution B, optionally followed by drying, and then to impregnate it with the solution A. Furthermore, the solution A and B can be mixed and the support may be impregnated with the common solution.

The solution A or the solution B or the common solution of A and B is used in quantities which correspond from 10 to 110%, advantageously 90–100%, of the absorptive capacity of the catalyst support. It is preferred to use water as a solvent for the solution A and B, but it is also possible to employ suitable organic or aqueous-organic solvents.

For example, palladium chloride, sodium-palladium chloride, palladium nitrate and palladium sulphate can serve as palladium salts in solution A, and, for example, auric chloride and tetrachloroauric acid can be employed as gold salts in the solution. In the process according to the invention, it is advantageous to use the generally accessible tetrachloroauric acid and sodium-palladium chloride, which have good water-solubility. The solution A can optionally also contain salts of other metals, for example of magnesium, calcium, barium, rare earths, chromium molybdenum, tungsten, manganese, rhenium, iron, cobalt, nickel, ruthenium, rhodium, iridium, platinum and copper.

The compounds in solution B can, for example, consist of alkali metal hydroxides, alkali metal bicarbonates and alkali metal carbonates, and these can be used by themelves of as a mixture.

Substances which, under the reaction conditions, do not lose their mechanical strength under the influence of acetic acid are particularly suitable as catalyst supports. Silicic acid and silicates are, for example, suitable. The catalyst supports can vary within wide limits as regards their physical properties.

Physical properties in the following range are, for example, suitable: absorptive capacity from 100–1000 g. of water per kg. of catalyst support, internal surface according to BET of 50–200 m.$^2$/g. and a mean pore diameter of from 100 to 500 A.

The reaction of the compounds of solution B with the noble metal salts of solution A can, for example, be described by the stoichiometric equations:

$$Na_2PdCl_4 + 2NaOH \rightarrow Pd(OH)_2 + 4NaCl$$

$$HAuCl_4 + NaOH \rightarrow Au(OH)_3 + H_2O + 4NaCl$$

The following explanations are also given concerning the process according to the invention: the quantities of the compounds contained in the solution B are preferably such that they are at least sufficient for the stoichiometric reaction with the salts contained in the solution A to form water-insoluble noble metal compounds. However, the compounds in the solution B can also be employed in excess, for example in 1–10 times the quantity which is stoichiometrically necessary. The reaction of the compounds in the solution B with the noble metal salts of the solution A to form insoluble noble metal compounds takes place on the support, either quickly or slowly, according to the conditions which are used. Other compounds which influence the speed of the reaction can be added to the solution B, e.g. salts of weak acids and strong bases or salts of strong acids and weak bases, for example, sodium acetate or sodium phosphates. If the solutions A and B are mixed before being used for impregnation, there is generally a precipitation of water-insoluble noble metal compounds after a certain time. In this case, the impregnation with the common solution is preferably effected before the precipitation of the water-insoluble noble metal compounds. The reaction of the compounds of solution B with the noble metal salts of solution A on the support is generally completed after about 24 hours. Then 95% at least of the palladium and 95% at least of the gold are converted into water-insoluble noble metal compounds.

In carrying out the process according to the invention, the reaction of the solutions on the support can be performed at normal or elevated temperature, for example 70° A. After the reaction is complete, the water-soluble compounds which are contained in the catalyst support, e.g. alkali metal chlorides and also any excess of the compounds contained in solution B which may be present, are removed by washing with water. The catalyst washed with water is treated with alkali metal carboxylate solutions, so that the catalyst, after drying, contains from 1 to 30% by weight of alkali metal carboxylate. The water-washed catalyst can be dried before the treatment with alkali metal carboxylates, whereupon the latter can be applied for impregnation purposes as a solution.

The alkali metal carboxylates can also be applied by introducing solutions containing alkali metal carboxylates into the hot gas stream before the reactor, and then vaporizing the solutions together with the alkali metal carboxylates, so that the alkali metal carboxylates are supplied in gaseous form to the catalyst.

The water-insoluble noble metal compounds contained in the catalyst after the time/temperature treatment are treated with reducing agents. This can take place before or after the washing to remove the water-soluble compounds and before or after the application of the alkali metal compounds.

The reduction can be effected in liquid phase, e.g. with aqueous hydrazine hydrate, or in the gas phase, e.g. with hydrogen, ethylene or methanol vapours. The reduction can be carried out under normal or elevated temperature, and at normal or elevated pressure. Preferred procedures as regards the reduction according to the invention are the treatment of the water-washed catalyst with ethylene at 100–200° C. and pressures of from 1–10 atm. gauge, or the treatment of the catalyst which has not been washed with water and prior to the washing with aqueous or aqueous alkaline hydrazine solutions at normal pressure and at room temperature. The prepared catalyst advantageously contains from 0.5 to 6.0 g. of palladium and from 0.1 to 3.0 g. of gold per litre of the catalyst (bulk volume).

Instead of applying alkali metal carboxylates to the catalyst, it is also possible to start with alkali metal compounds which are transformed wholly or in part into alkali metal carboxylates under the reaction conditions, such as alkali metal hydroxides, carbonates, borates and phosphates. Lower carboxylic acids with 2–4 carbon atoms include acetic acid, propionic acid, isobutyric acid and n-butyric acid.

The invention is illustrated by the following examples.

EXAMPLE 1

The catalyst was prepared in the following manner: 1 litre of a silicic acid support with an internal surface area of 130 m.$^2$/g., a weight per unit volume of 0.5 g./cc. and an absorptive capacity of 400 ml. of water per litre of catalyst support was evacuated in a shaker-type vessel and then impregnated, while shaking, with 390 ml. of an aqueous solution of $Na_2PdCl_4$ and $HAuCl_4$, which corresponded to a quantity of 3.3 g. of Pd and 1.5 g. of Au. The catalyst was thereafter dried in a rotary evaporator under a water jet vacuum. The dried catalyst was evacuated in a shaker-type vessel and treated while shaking with a solution of 6 g. of NaOH in 390 ml. of water. The catalyst was left to stand for 16 hours with distilled water. By analysing the washing water, it was found that more than 99% of the palladium introduced and more than 98% of the gold had been converted into water-insoluble compounds. The catalyst was dried, whereupon it was impregnated with 30 g. of potassium acetate as an aqueous solution, and the catalyst was dried again. Finally, the catalyst was reduced at 150° C. and at 5 atm. gauge for 24 hours in a stream of ethylene. 2,330 ml. of the catalyst thus prepared were introduced into a reaction tube having a length of 5 m. and an internal diameter of 25 mm. 51.7 mols of acetic acid, 169.5 mols of ethylene and 16.6 mols of oxygen per hour in gaseous form were then conducted at the inlet of the reactor over the catalyst at 176° C. and a pressure of 5.3 atm. gauge. 452 g. of vinyl acetate were formed hourly per litre of catalyst. Of the ethylene reacted, 91.6% had been converted into vinyl acetate and 8.4% into carbon dioxide.

EXAMPLE 2

The catalyst was prepared in the following manner: 1 litre of the catalyst support of Example 1 was impregnated with 400 ml. of an aqueous solution containing 12 g. of NaOH and dried, whereupon it was impregnated with 380 ml. of an aqueous solution of $Na_2PdCl_4$ and $HAuCl_4$, which corresponds to an amount of 3.3 g. of Pd and 1.5 g. of Au. The catalyst was left standing for 24 hours at room temperature. Washing of the catalyst, impregnation with alkali metal acetate and reduction with ethylene were carried out in the same manner as in Example 1. Under the same reaction conditions as in Example 1, results were obtained with the catalyst which are comparable with those of Example 1.

EXAMPLE 3

The catalyst was prepared in the following manner: An aqueous solution of $Na_2PdCl_4$ and $HAuCl_4$ was added while stirring to a solution of 42 g. of $K_2CO_3$ in water. The combined solution was diluted with water to 390 ml. and 1 litre of the catalyst support referred to in Example 1 was impregnated therewith. The catalyst was left standing for 16 hours at room temperature. Washing of the catalyst, impregnation with alkali metal acetate and reduction with ethylene took place in the same way as in Example 1. Under the same reaction conditions as in Example 1, results were obtained with the catalyst which are comparable with those of Example 1.

EXAMPLE 4

The catalyst was prepared as in Example 1, but a support was used which had an internal surface of 165 m.$^2$/g.; before the catalyst was impregnated with potassium acetate, it ws reduced for 4 hours with ethylene at 150° C., without using pressure, 2,330 ml. of the catalyst thus prepared were placed in a reaction tube with a length of 5 m. and an internal diameter of 25 mm. 200 mols of ethylene, 60 mols of acetic acid and 15 mols of oxygen per hour were conducted in gaseous form over the catalyst, with a pressure of 8.2 atm. gauge at the inlet to the reactor. The gas was heated before entering the reactor in a superheater to the reaction temperature. A solution of potassium acetate in acetic acid was continuously pumped into the reactor and vaporised. 10 p.p.m. of potassium as potassium acetate based on the amount of acetic acid introduced at the inlet of the reactor were continuously supplied to the reactor. The test was carried out over a period of 2,100 hours. During this time, the reaction temperature was raised from 156 to 168° C. On average, throughout the entire test, 380 g. of vinyl acetate were formed per litre of catalyst and per hour. Of the reacted ethylene, 96% was converted to vinyl acetate and 4% to carbon dioxide.

EXAMPLE 5

The catalyst was prepared as in Example 4, but, before impregnating the catalyst with potassium acetate, it was reduced with an aqueous hydrazine solution, washed with water and dried.

900 ml. of catalyst thus obtained were introduced into a reaction tube with a length of 2 m. and an internal diameter of 25 mm. 77 mols of ethylene, 19 mols of acetic acid and 5.8 mols of oxygen per hour were conducted in gaseous form over the catalyst at 140° C. and at a pressure of 8 atm. gauge. 235 g. of vinyl acetate were formed per litre of catalyst and per hour. Of the reacted ethylene, 97.7% was converted to vinyl acetate and 2.3% to carbon dioxide.

EXAMPLE 6

The catalyst was prepared in the following manner: 1 litre of a silicic acid support with an internal surface of 165 m.$^2$/g., a weight per unit volume of 0.5 g./cc. and an absorptive capacity of 400 ml. of water per litre of catalyst support was evacuated in a shaker-type vessel and then impregnated, while shaking, with 390 ml. of an aqueous solution of $Na_2PdCl_4$ and $HAuCl_4$, which corresponded to a quantity of 3.3 g. of Pd and 1.5 g. of Au. The catalyst was thereafter dried in a rotary evaporator under a water jet vacuum. The dried catalyst was left to stand for 16 hours at room temperature and was then washed for 24 hours with distilled water. By analysing the washing water, it was found that more than 99% of the palladium introduced and more than 98% of the gold introduced has been converted into water-insoluble compounds. The catalyst was then dried, whereupon it was impregnated with 30 g. of potassium acetate as an aqueous solution, and was then dried again. Finally, the catalyst was reduced at 150° C. and at 5 atm. gauge for 24 hours in a stream of ethylene. 900 ml. of catalyst thus prepared were introduced into a reaction tube having a length of 2 m. and an internal diameter of 24 mm. 6.3 mols of propionic acid, 84 mols of ethylene and 6.2 mols of oxygen per hour in gaseous form were then conducted over the catalyst at 140° C. and an inlet-pressure of 8 atm. gauge, 289 g. of vinyl acetate were formed every hour per litre of catalyst. Of the ethylene reacted, 96% had been converted into vinyl acetate and 4% into carbon dioxide.

EXAMPLE 7

The catalyst was prepared as in Example 6, but using a silicic acid support with an internal surface of 130 m.$^2$/g. and treating the catalyst, after the treatment with the sodium hydroxide solution, with an aqueous hydrazine solution at room temperature. The catalyst was thereafter washed with water, dried and then coated with potassium acetate, as in Example 6. 900 ml. of the catalyst thus obtained were introduced into a reaction tube with a length of 2 m. and an internal diameter of 25 mm. 6.3 mol of isobutyric acid, 84 mols of ethylene and 6.2 mols of oxygen were hourly conducted in gaseous form over the catalyst at 150° C. and at a pressure of 5 atm. gauge. 190 g. of vinyl isobutyrate were formed per litre of catalyst per hour. Of the reacted ethylene, 96% was converted to vinyl isobutyrate and 4% to carbon dioxode.

What we claim is:

1. Improvement in a process for the production of vinyl esters by reacting ethylene, lower carboxylic acids with 2 to 4 carbon atoms and oxygen in the gas phase at elevated temperature and normal or elevated pressure, in the presence of supported catalyst consisting essentially of palladium, gold and an alkali metal acetate on a silicic acid support, which improvement comprises preparing the catalyst by treating the support, simultaneously or successively or in combination with a solution A and a solution B, the solution A containing dissolved salts of palladium and gold and the solution B containing compounds which are able to react on the catalyst support with the noble metal salts of the solution A to form water-insoluble noble metal compounds which are substantially free of halogen, sulphur and nitrogen; impregnating the catalyst support with the solutions A and B or with the combined solution of A and B in quantities which correspond to from 1 to 110% of the absorptive capacity of the catalyst support for these solutions: subjecting the catalyst support impregnated with the solutions A and B to a time/temperature-treatment which is such that 95% at least of the impregnated palladium and 95% at least of the impregnated gold is transformed into water-insoluble noble metal compounds, treating the water-insoluble noble metal compounds with a reducing agent to convey those compounds substantially into the corresponding noble metals and removing the water-soluble compounds which are contained in the catalyst by washing; and applying an alkali metal compound before or after the treatment with the reducing agents, the alkali metal compounds consisting of alkali metal carboxylates or of alkali metal compounds which are wholly or in part transformed into alkali metal carboxylates under the reaction conditions.

2. A process according to claim 17, in which said alkali metal compound is an alkali metal carboxylate.

3. A process according to claim 2, in which the alkali metal compounds are applied in such quantities that the catalyst, after being dried, contains from 1 to 30% by weight of alkali metal carboxylate.

4. A process according to claim 1, in which water is used as a solvent for solution A and solution B or for the combined solution A and B.

5. A process according to claim 1, in which sodium-palladium chloride ($Na_2PdCl_4$) and tetrachloroauric acid ($HAuCl_4$) ar used as noble metal salts.

6. A process according to claim 4, in which water is used as a solvent for solution A and solution B or for the combined solution A and B.

7. A process according to claim 1, in which alkali metal hydroxides, alkali metal bicarbonates or alkali metal carbonates separately or in admixture, are contained in solution B as compounds which react on the catalyst support with the noble metal salts, with the formation of water-insoluble noble metal compounds which are substantially free of halogen, sulphur and nitrogen.

8. A process according to claim 5, in which sodium-palladium chloride ($Na_2PdCl_4$) and tetrachloroauric acid ($HAuCl_4$) are used as noble metal salts.

9. A process according to claim 1, wherein impregnation is firstly effected with the solution A, followed by drying, and then with solution B.

10. A process according to claim 1, wherein the solution A and the solution B are used for impregnation on the catalyst in quantities which correspond to 90–100% of the absorptive capacity of the catalyst for these solutions.

11. A process according to claim 9, wherein impregnation is firstly effected with the solution A, followed by drying, and then with solution B.

12. A process according to claim 1, wherein the noble metal salts are used in such quantities that the prepared catalyst contains from 0.5 to 6.0 g. of palladium and from 0.1 to 3.0 g. of gold per liter of catalyst.

13. A process according to claim 10, wherein the solution A and the solution B are used for impregnation on the catalyst in quantities which correspond to 90–100% of the absorptive capacity of the catalyst for these solutions.

14. A process according to claim 1, wherein the silicic acid support has an internal surface area of from 50 to 200 m.$^2$/g. BET.

References Cited

UNITED STATES PATENTS

| | | | |
|---|---|---|---|
| 3,579,569 | 5/1971 | Montgomery et al. | 260—497 A |
| 3,488,295 | 1/1970 | Sennewald et al. | 260—497 A |
| 3,670,014 | 6/1972 | Fernholz | 260—497 A |

FOREIGN PATENTS

| | | | |
|---|---|---|---|
| 1,128,993 | 10/1968 | United Kingdom | 260—497 A |

LORRAINE A. WEINBERGER, Primary Examiner

R. D. KELLY, Assitant Examiner

UNITED STATES PATENT OFFICE
CERTIFICATE OF CORRECTION

Patent No. 3,822,308          Dated July 2, 1974

Inventor(s) Walter Kronig and Gerhard Scharfe

It is certified that error appears in the above-identified patent and that said Letters Patent are hereby corrected as shown below:

In the heading, please insert the following:

claims priority of German Serial No. P 16 68 088.9, filed February 1, 1968, amended September 28, 1969
and
German Serial No. P 17 93 519.2, filed September 28, 1969.

Column 2, line 61
change the word         "of"
to         --or--.

Column 4, line 75, the
word         "ws"
should read         --was--.

Column 6, line 51, the
word         "ar"
should read         --are--.

Signed and sealed this 29th day of October 1974.

(SEAL)
Attest:

McCOY M. GIBSON JR.         C. MARSHALL DANN
Attesting Officer         Commissioner of Patents